United States Patent Office 3,669,631
Patented June 13, 1972

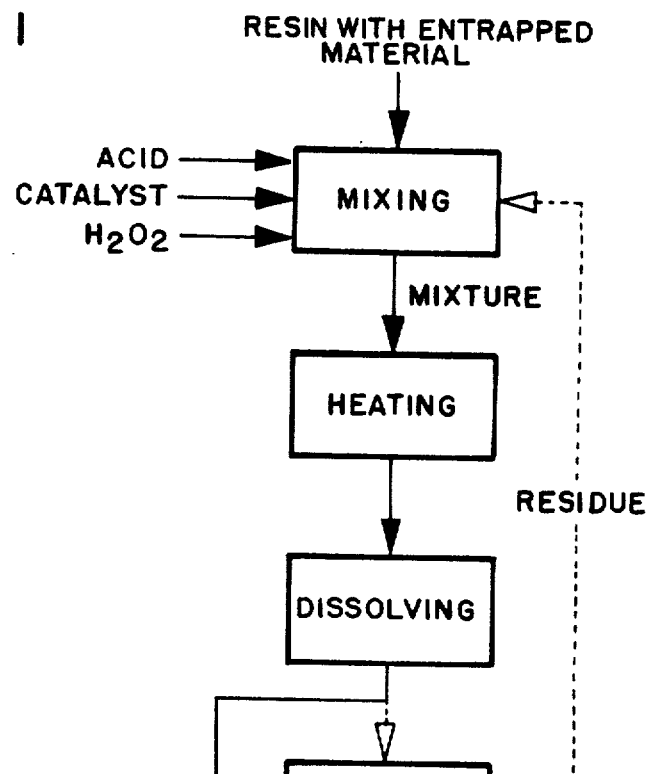
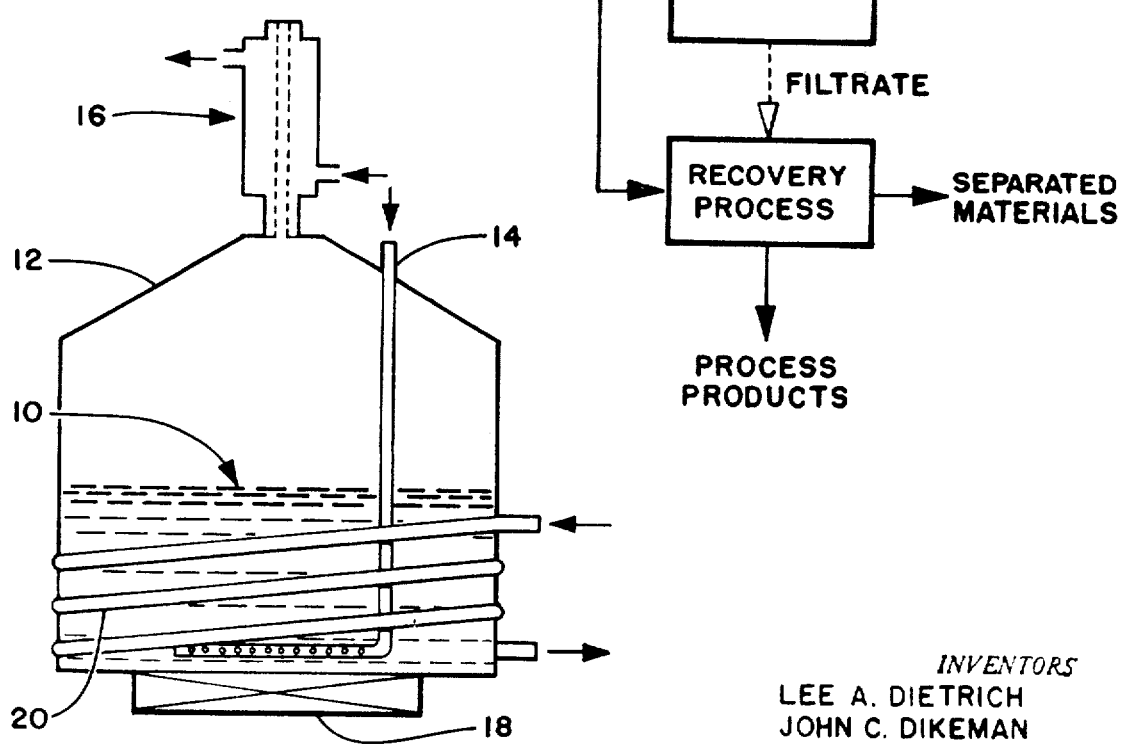

3,669,631
REMOVAL OF MATERIALS FROM ION EXCHANGE RESINS
Lee A. Dietrich, Bellbrook, John C. Dikeman, West Carrollton, and Kenneth R. Johnson, West Milton, Ohio; said Dietrich and Dikeman assignors to the United States Atomic Energy Commission
Filed Jan. 8, 1970, Ser. No. 1,483
(Filed under Rule 47(a) and 35 U.S.C. 116)
Int. Cl. B01f 1/00; B01j 9/04
U.S. Cl. 23—342                4 Claims

ABSTRACT OF THE DISCLOSURE

A process for removal of materials from spent ion exchange resin wherein the spent resin is mixed with an acidic solution including a catalyst and hydrogen peroxide, and the mixture is heated to a temperature at which the exothermic reaction of the mixture is initiated and maintained at that temperature until the reaction is completed. The resulting solution may be filtered and the filtrate further processed to recover the desired materials.

BACKGROUND OF THE INVENTION

Ion exchange resins are widely used in atomic energy programs for recovering valuable radioisotopes and for various separating and purifying processes. After continued use or exposure to the heat and radiation from radioisotopes, such ion exchange resins often deteriorate or otherwise become unsuitable for continued use. For instance, heat and radiation from radioisotopes may cause the resins to char and lose their chemical selectivity. At this point, the degraded resin may be considered to be "spent" since it no longer has the desirable ion exchange properties or characteristics. Even through such "spent" ion exchange resins are no longer suitable or sufficiently effective for continued use in ion exchange processes, the resins frequently retain small quantities of the radioisotopes or other transition elements within the resin matrix. Because of the value of some of these radioisotopes or transition elements and possible radiation hazards, it may be desirable to recover even very small quantities of material entrapped in the resin for later use or disposal. Once these materials have been recovered from spent resin, the resin may be discarded.

Because of the nature of ion exchange resins, small quantities of material contained within the resin may be difficult to remove therefrom, especially when the resin itself is substantially insoluble in most reactants. Additionally, since many resins may include nitrates in their chemical structure, decomposition of the resins by charring may inherently produce potentially dangerous explosive conditions. Furthermore, decomposition of the resins, in many instances, produces abnormally large quantities of undesirable by-products or residues which may be difficult to dissolve for further purification or processing.

SUMMARY OF INVENTION

In view of the limitations of the prior art, it is an object of this invention to provide a process for the removal of materials in readily useable form from spent ion exchange resins.

It is a further object of this invention to recover radioisotopes from spent ion exchange resins.

Various other objects and advantages will appear from the following description of the invention and the most novel features will be particularly pointed out hereinafter in connection with the appended claims.

The present invention comprises mixing a spent ion exchange resin with an acidic solution containing a catalyst and hydrogen peroxide, heating the mixture to initiate an exothermic reaction and maintaining the mixture at the reaction temperature until the reaction is complete with the resin entrapped materials dissolved.

DESCRIPTION OF DRAWINGS

Aspects of the present invention are shown in the drawings, wherein:

FIG. 1 is a block diagram showing process steps associated with the present invention; and FIG. 2 is a somewhat diagrammatic view of an apparatus for performing this process.

DETAILED DESCRIPTION

As shown in the flow diagram of this process illustrated in FIG. 1, suitable spent or depleted resin containing entrapped residues of material desired to be recovered may be mixed in an acidic solution containing a sufficient quantity of appropriate catalyst and hydrogen peroxide to dissolve at least a substantial portion of the resin and to permit dissolution of the material residues. The mixture may then be heated to initiate an exothermic reaction, generally at about 60° C., and maintained from about 60° C. to 100° C. until the reaction is completed and the resin dissolved. The reaction may be accompanied by vigorous foaming of the mixture which, when the reaction is complete, may cease to foam with a concomitant drop in mixture temperature. The remaining mixture or solution which includes dissolved resin constituents and material residues may then be concentrated, precipitated or otherwise processed by conventional recovery or separation processes well known in the art to recover the dissolved material residues.

Typical recovery or separation processes may include further ion exchange resin processes aqueous fluoride volatility or precipitation processes. Some typical processes may be those described by S. G. Abrahamson in the Journal of Inorganic and Nuclear Chemistry, vol. 29, pages 842–44 (1967), incorporated by reference herein to illustrate the state of the art.

The dissolving step may be accompanied by either additional heating or by cooling, depending on the amount of heat produced by the exothermic reaction. If the exothermic reaction is not self-sustaining, some continued heating may be required. If the exothermic reaction is self-sustaining, cooling may be required to prevent or minimize volatilization of the process reagents and excessive foaming. Volatilization or foaming may remove sufficient reagents from the mixture to impede or inhibit continuance of the reaction, or some of the materials to be recovered may be inadvertently carried with the vapors and thus prevent their recovery. It therefore may be desirable to condense any process vapors to minimize these latter effects.

If all the resin or other materials or reagents are not dissolved during the dissolution step of the process, the remaining mixture may be filtered by suitable fritted glass or stainless steel filters to remove any residues. The residues may then be recycled through the mixing, heating and dissolving steps while the filtrate continues through the desired recovery process as shown in FIG. 1 by the dotted lines in the flow diagram.

The different portions of this process may be performed with any conventional apparatuses which may provide any of the desired operating characteristics of the process. A particularly useful apparatus for the mixing, heating and dissolving steps may be that shown in FIG. 2. In the apparatus illustrated, the process materials and reagents 10 may be mixed in a suitable enclosed vessel 12 by conventional mechanical mixer (not shown) and/or by a perforated-type, gas sparge line 14. Vessel 12 may be made of or lined with any appropriate material which is non reactive with the process materials and reagents such as stainless steel, polytetrafluoroethylene or glass and may be provided with any necessary access and viewing ports (not shown). A suitable water or otherwise cooled condenser 16 may be disposed in communication with the interior of vessel 12 so as to condense any vapors volatilized from mixture 10 and recycle the condensate back thereto. Mixture 10 may be heated by heater 18 to the reaction temperature, and the temperature maintained thereat during dissolution if needed by a combination of heater 18 and appropriately cooled cooling coils 20. The remaining mixture or solution may be removed from vessel 12 and further processed as required by the particular process products involved.

This present process may be used to remove or recover entrapped materials from ion exchange resins, for example, as organic ion exchange resins, such as those incorporating functional groups of coal, lignin and peat, those incorporating functional groups of cellulose fabrics by phosphorylation with urea and phosphoric acid and by reaction with 2-aminoethylsulfuric acid to provide ion exchange properties, as well as those formed by the polymerization of polystyrene cross-linked with divinyl benzene. The functional groups that may be attached to these organic materials include sulfonic, phosphonic, carboxylic, phenolic, and thiol groups, primary, secondary and tertiary amines, or chelating groups, such as ethylenediamine tetraacetic acid or m-phenylene diglycine that produces an ion exchange material with a high selectively for the transition elements. These ion exchange materials may be liquids, or more normally, solid beads. Coherent sheets of ion-exchange resin, i.e., ion-exchange membranes might also be processed.

The entrapped materials may be any materials which are especially useful or expensive or which present sufficient potential radiation hazards or which otherwise may be desirable to be recovered from the resin. Such materials may include isotopes of plutonium, uranium, thorium, actinium, or other heavy element isotopes and those forming anionic complexes. The acid used to dissolve the entrapped materials may be any suitable acid, such as nitric acid, depending on the materials being dissolved and the desired form of the dissolved materials for the further recovery processes. Nitric acid concentrations of from about 0.3 to 8.0 normal are satisfactory and higher concentrations may be used if desired. It has been found that a particularly good catalyst is potassium ferrocyanide, for example with a molar concentration from about 0.002 to 0.03, or higher if desired, with a 30% hydrogen peroxide solution. Other catalysts which may be used include other forms of ferrocyanide or other such ferrocyanide combinations as may be formed with elements selected from group I of the periodic chart as set forth by Mendeleev. Various catalysts of the same nature as the ferrocyanide combinations may be used equally advantageously.

It has been further found that the process of this invention may be performed most effectively with certain prescribed volume percentages of the reagents to the resin volume. For example, most effective results may be achieved by using a mixture from about two parts resin to five parts by volume of solution having about 0.35 N acid and 0.002 M catalyst and about 15 to 2 parts by volume of 30% hydrogen peroxide to the initial resin volume. Such a mixture may exothermically react at temperatures from about 60 to 90° C. and be maintained at a temperature below the boiling point thereof. In practice, the mixture containing the 30% hydrogen peroxide may be heated to about 60° C., a temperature at which the exothermic reaction may begin. The mixture may be contoured to be further heated to about 90° C., a temperature just below the boiling point. The temperature is then maintained at about 90° C. by circulating coolant through coils 20, until the reaction is completed. Care must be taken to ensure that the temperature does not exceed the boiling temperature because excessive foaming may occur and result in diluting the mixture and slowing the reaction.

For most effective operation of the process, it is desirable that the ion exchange resin being processed be in the nitrate form. In many instances ion exchange resins may be converted with sodium hydroxide and sodium carbonate washes from the nitrate form, for purpose of safety, when the resin is stored for any length of time. Before conversion and storage, the resin may be washed with about .35 normal hydroxylamine and with about .35 normal nitric acid to remove any easily dissolved residues at that time. In such instances, the stored resin may be reconverted to the nitrate form by successive washes in 2 N nitric acid until the solution is acidic. The solutions may then be decanted and the nitrated resin suitably processed.

Plutonium may be recovered from an ion exchange resin, such as polystyrene divinylbenzene, using this process with potassium ferrocyanide catalyst as shown by the following table:

| Run No | 1 | 2 | 3 | 4 |
|---|---|---|---|---|
| Volume of resin (ml.) | 400 | 200 | 500 | 200 |
| Volume of $HNO_3$ (ml.) | 1,000 | 500 | 1,000 | 500 |
| Normality of $HNO_3$ | 0.35 | 0.35 | 0.35 | 0.5 |
| $K_4Fe(CN_6)$ (grams) | 0.8 | 0.2 | 0.8 | 0.4 |
| $H_2O_2$ used (percent) | 30 | 15 | 30 | 30 |
| Volume $H_2O_2$ used (ml.) | 3,000 | 1,500 | 3,000 | 1,500 |
| Temperature (° C.) | 90 | 90 | 90 | 90 |
| Reaction time (hr.) | 6.2 | 4.3 | 6.4 | 3.6 |
| Resin dissolved (percent) | 85 | 80 | 70 | 85 |
| Pu in resin (grams) | 0.120 | 0.041 | 0.267 | 0.023 |
| Pu in final solution (grams) | 0.109 | 0.034 | 0.221 | 0.019 |
| Pu in filter residue (grams) | 0.005 | 0.007 | 0.009 | 0.002 |
| Pu recovered (percent) | 90.9 | 82.9 | 82.7 | 82.6 |

As can be seen from this table, a high percentage of the plutonium entrapped in the spent ion exchange resin may be removed from the resin. The filter residue may be recycled through the process to remove a substantial portion of the remaining plutonium until the remaining plutonium is below a safe radiation level for discard and disposal.

An ion exchange resin having similar impurities as the resin used in the table except having uranium dioxide residue instead of plutonium dioxide may be readily dissolved with this process using the same acid, catalyst and hydrogen peroxide solutions and similar volume percentages. The resin may be 80 to 98% dissolved in reaction times of about 2.2 to 10.4 hours and reaction temperature of about 100° C.

It will be understood that various changes in the details, materials and arrangements of the parts, which have been herein described and illustrated in order to explain the nature of the invention, may be made by those skilled in the art within the principles and scope of the invention as expressed in the appended claims.

What is claimed is:

1. A process for removing entrapped radioisotopic materials from ion exchange resins by dissolution of said resins, said process comprising mixing a volume of a polystyrene divinylbenzene ion exchange resin containing entrapped radioisotopic materials in a solution containing from about 2 to about 2.5 volumes of from about 0.3 to about 8.0 normal nitric acid and from about 0.002 to about 0.03 molar potassium ferrocyanide catalyst, and said solution also containing from about 15 to about 2 volumes of an about 30% hydrogen peroxide solution, heating said solution mixture to a temperature of from about 60° C. to about 100° C. to initiate the exothermic reaction of said solution mixture, maintaining the said solution mixture temperature after initiation of said exothermic reaction at a level between about 60° C. and about 90° C. to maintain the reaction to dissolve said resin in said solution mixture, recovering the resulting solution containing dissolved radioisotopic materials, and separating said dissolved radioisotopic materials from said resulting solution.

2. The process of claim 1 wherein the resulting solution is recovered by filtering the solution and retaining the filtrate and any filter residue is recycled through said mixing, heating, maintaining and recovering steps.

3. The process of claim 1 wherein said entrapepd materials include plutonium.

4. The process of claim 1 including the step of condensing vapors evolved from said mixture and returning the same to the mixture.

References Cited
UNITED STATES PATENTS

| | | | |
|---|---|---|---|
| 2,914,378 | 11/1959 | Kennedy | 210—30 |
| 3,005,682 | 10/1961 | Wilson | 23—342 |
| 3,252,920 | 5/1966 | Goren | 23—338 |
| 3,268,288 | 8/1966 | Goren | 23—321 |
| 3,375,202 | 3/1968 | Laveissiere et al. | 252—301.1 |
| 3,453,214 | 7/1969 | Bonnin et al. | 23—337 |

OTHER REFERENCES

Snyder, Dissolution of Ion Exchange Resins in Alkaline Permanganate—Nuclear Science Abstracts, vol. 20, No. 22, November 1966, Abstract No. 41031.

CARL D. QUARFORTH, Primary Examiner

F. M. GITTES, Assistant Examiner

U.S. Cl. X.R.

23—312 A, ME, 338, 344; 210—29, 32